United States Patent

Casey, Jr. et al.

[15] 3,697,834

[45] Oct. 10, 1972

[54] RELAXATION SEMICONDUCTOR DEVICES

[72] Inventors: Horace Craig Casey, Jr.; Willy Werner van Roosbroeck, both of Summit, N.J.

[73] Assignee: Bell Telephone Laboratories, Incorporated, Murray Hill, N.J.

[22] Filed: Jan. 27, 1971

[21] Appl. No.: 110,140

[52] U.S. Cl. ....................................317/237, 317/234

[51] Int. Cl. ...............................H01l 3/20, H01l 5/00

[58] Field of Search .......................................317/234

[56] References Cited

UNITED STATES PATENTS

| | | | |
|---|---|---|---|
| 2,908,871 | 10/1959 | McKay | 331/108 |
| 3,465,176 | 9/1969 | Tanaka et al. | 307/308 |
| 3,530,014 | 9/1970 | Antell | 148/187 |
| 3,531,698 | 9/1970 | Atalla | 317/235 |

*Primary Examiner*—James D. Kallam
*Attorney*—R. J. Guenther and Edwin B. Cave

[57] ABSTRACT

A class of semiconductor devices depend for their operation on the use of material in which dielectric relaxation time exceeds diffusion-length lifetime. Devices which may have two or more electrodes may perform a variety of functions, some of which are based on negative resistance characteristics. Such functions include switching, memory, amplification, oscillation, etc.

8 Claims, 3 Drawing Figures

INVENTORS: H. C. CASEY, JR.
W. W. VAN ROOSBROECK
BY George S. Indig
ATTORNEY

RELAXATION SEMICONDUCTOR DEVICES

BACKGROUND OF THE INVENTION

1. Field of the Invention

The invention is concerned with semiconductor devices having two or more electrodes and capable of performing a variety of functions including switching, memory, amplification, oscillation, etc.

2. Description of the Prior Art

The past two decades have seen a proliferation of semiconductor devices which have revolutionized the industry. Such devices include rectifiers, transistor amplifiers and oscillators, parametric devices, switches, memories, etc. Virtually no significant area of technology has remained unaffected.

While material requirements for such devices are clearly diverse, they have certain characteristics in common. Parameters which are necessarily tailored to specific device needs include resistivity, number of mobile carriers, number of donor and acceptor impurities and distribution, junction configuration, trapping centers—their nature and distribution, junction profile, etc. It is noteworthy, however, that all such devices are based on the use of material in which carrier lifetime is greater than dielectric relaxation time. This gives rise to the familiar situation of near-zero space charge. That is, in semiconductors which have found use in common devices, the space charge associated with injected minority characters is virtually instantaneously neutralized by the equal and opposite charge produced by a perturbation in distribution of mobile majority carriers.

All of the authoritative texts on semiconductors deal exclusively with this condition. Other possible semiconductor regimes have been largely ignored.

SUMMARY OF THE INVENTION

A new class of semiconductor devices is based on material in which dielectric relaxation time exceeds diffusion length lifetime. The prototype device has two electrodes and but a single p–n junction although variations may incorporate additional junctions and/or electrodes. For ease of description, the inventive class of devices are generically denoted "injector diodes." This is considered appropriate since the novel device operation is premised largely on such diode characteristics whether or not the diode is supplemented by additional junctions and/or electrodes.

A common feature of all devices, in accordance with the invention, may be expressed in terms of the current-voltage characteristic in either forward or reverse bias condition. All such characteristics include both a region in which there is a substantially linear dependence of current on voltage and also a region in which there is sublinear relationship. Further increase in voltage may or may not result in a further change in the I(V) characteristic. For example, a particular type of device in a forward biased condition may evidence negative resistance while a reverse biased device of the same or similar structure may show a superlinear current-voltage relationship.

Patentability, as noted, is largely premised on the sublinear I(V) relationship which, in turn, results in relaxation semiconductor devices only when the zero-bias space-charge region is enclosed within a semiconductor region. It will be seen that the sublinear relationship is dependent upon effective expansion of the space charge into "normal" semiconductor material, and it therefore follows that the length of a relevant region must be sufficient to include both the zero-bias space-charge region and some "normal" material.

Utilization of an inventive device may simply depend on the sublinear relationship (under certain circumstances approximately a square root relationship) so that it may operate as a current or voltage control device. Other uses may depend on the superlinear relationship (again, as control elements) or may operate as switches due to the negative resistance characteristic.

DETAILED DESCRIPTION

1. The "Relaxation" Semiconductor—A Brief Description

Figure 1:
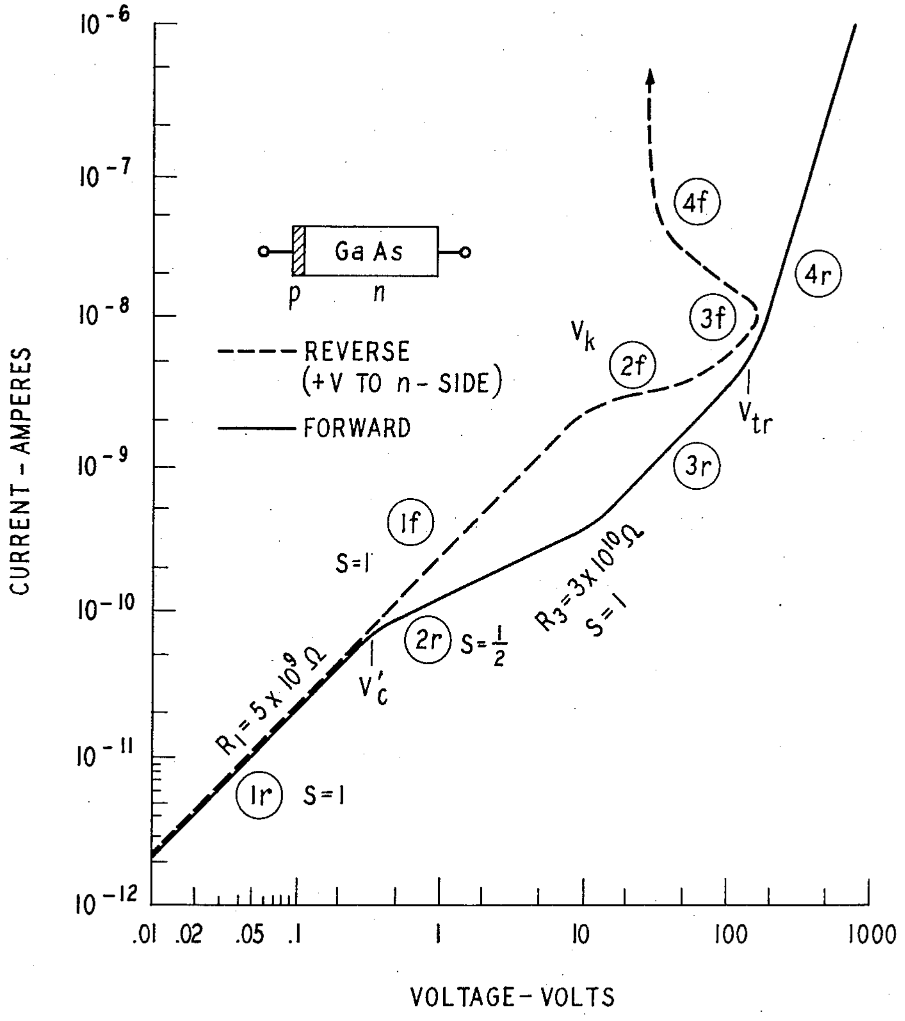
FIG. 1, on coordinates of current and voltage, is a plot showing the forward and reverse I(V) characteristic for a typical device in accordance with the invention.

The invention is based on the "relaxation" semiconductor, i.e., a semiconductor (extrinsic or intrinsic) in which the dielectric relaxation time exceeds the diffusion-length lifetime. This very concept runs counter to the traditional textbook treatment of semiconductor materials, all of which assume zero or near-zero space charge. While "relaxation" semiconductors are not, per se, the subject of any of the appended claims, an understanding of the invention requires some background information regarding the material.

In the following description, reference is made to certain relations and concepts which are described in detail in the literature. In such instances, a reference to such literature is set forth in lieu of a complete physical description or equation derivation.

Certain terms appropriate to the description of the relaxation case are underlined. Such notation indicates that the terms are either coined or are used in a context which differs in some respect, however minor, from conventional use.

For reasons related to device operation, the main concern is with the so-called "large-signal" case. This has reference, in the instance of minority carrier injection, is sufficient injection to result in substantial majority carrier depletion. By substantial majority carrier depletion is meant the condition under which substantially all majority carriers have combined with injected minority carriers so as to produce a region within which further recombination does not ordinarily take place. Such a region which is of intrinsic or near-intrinsic conductivity and is bound at its extremity by a recombination front (herein defined). All claimed devices are concerned with the "large-signal" case. Those interested in pursuing the theoretical aspects of the "relaxation" semiconductor may find a description of the small-signal case in Vol. 123, Physical Review, P. 474 (1961).

For dielectric relaxation time $\tau_d$ greater than diffusion-length lifetime $\tau_0$, analysis of carrier transport in the nonlinear, large-signal case is given. This transport is drastically different than in the familiar case, for which $\tau_o >> \tau_d$ holds and near-zero space charge applies. Near-zero local recombination may apply instead, with enhanced space change and excess carrier concentrations that decay ultimately through dielectric relaxation. This case of $\tau_d >> \tau_o$ may be called the relaxation case, as distinguished from the familiar one of $\tau_o >> \tau_d$ or the lifetime case. The relaxation case may generally be expected with wide-energy-gap semiconductors (greater than 1 e.v.) for resistivities greater than about $10_4$ ohm-cm.

A principal result for the large-signal relaxation case is recombinative space-charge injection: Through injection of minority carriers, a stable space-charge condition of pronounced majority-carrier depletion may be realized in the steady state. The space charge is largely that of the ionized donors or acceptors and occupied traps. The minority carriers recombine beyond the low-conductivity region of the injecting junction before their charge can be neutralized through dielectric relaxation and extend this region rather than produce the electron-hole excess of the lifetime case. Under sufficient forward bias, a depletion drift region occurs in which diffusion is negligible, depletion is pronounced, and carrier concentrations are near intrinsic. If diode length is sufficient, the region ends in a recombination front in which electrons and holes recombine with drift currents about equal. Length of the region is then proportional to current, I, and potential drop, V, is proportional to $I^2$ and, thus, there is a range of I proportional to about $V^{1/2}$, independently of diode length. This sublinear characteristic may be contrasted with the exponential increase of current with forward bias in the lifetime case and with the $V^2$ characteristic that occurs when I is limited by space charge of mobile carriers.

Majority-carrier depletion is realized in principle as follows: The approximation of zero local recombination implies, with Boltzmann statistics, that the product $np$ of the electron and hole concentrations equals its thermal-equilibrium value, $n_o p_o = n_i^2$. In terms of excess concentrations $\Delta n$ and $\Delta p$, it (zero recombination) implies that $n_o\Delta p + p_o\Delta n + \Delta n\Delta p$ is zero. Then, an injected steady-state electron concentration $\Delta n$ gives $\Delta p = -p_o\Delta n/(n_o+\Delta n)$. In a p-type semiconductor, for example, $\Delta p \sim -p_o$ or substantially complete depletion of majority carriers thus results for $\Delta n$ that need merely be large compared with $n_o$. This essentially nonlinear, large-signal effect is recombinative space-charge injection, and can occur whether or not there is trapping. Note that while trapping is not required in principle, use of certain long-lifetime materials requires trapping to attain the fundamental requirement, i.e., that relaxation time exceed carrier lifetime. Increase trapping does, however, reduce required distance from the junction in which the space-charge regions can be confined.

2. The Drawing

Figure 2:
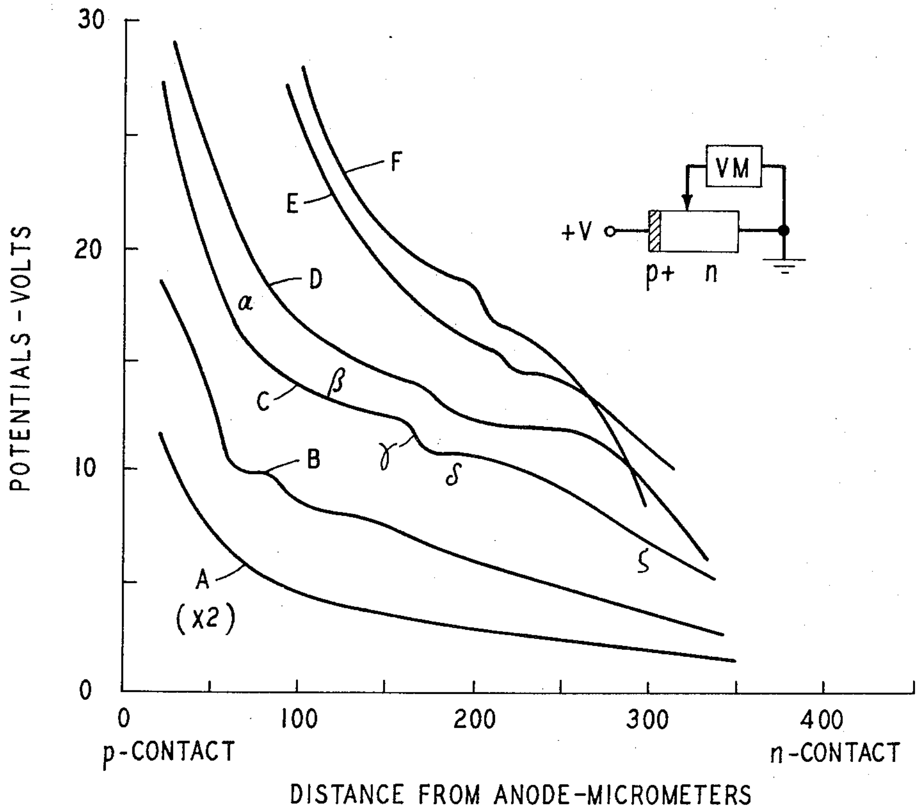
FIG. 2 on coordinates of voltage and distance from a forward biased junction, includes several curves plotted from voltage probe measurement under various bias conditions.

In this section, there is presented a detailed description primarily of FIGS. 1 and 2. The description is largely in terms of the experimental results which yielded the data plotted in these figures. Tentative explanations are given for some of the observed phenomena. Such considerations are not to be construed as limiting the appended claims which are set forth in terms of measurable design parameters. Postulated mechanisms set forth in this section as well as that preceding are intended to aid the practitioner or experimenter having a view to making specific utilization of selected device characteristics This section describes current-voltage and potential distribution measurements for GaAs p–n junctions which illustrate and confirm the theory of the relaxation regime. The current-voltage dependence of a relaxation-case junction is found to be completely different from the well-known "ideal rectifier" junction with its exponentially increasing forward current and saturated reverse (See (see Vol. 28, Bell System Technical Journal, p.435 (1949)).

Oxygen-doped and compensated single crystals of n-type GaAs with $n_o = 3\times10_7$ electrons/cm$^3$ and mobility $\mu_n = 4.5\times10^3$ cm$^2$/V-sec were used. Zinc diffusion created a $3\times10^{-4}$ cm deep p-layer with $p_s > 10^{20}$ holes/cm$^3$ at the surface. Ohmic In–Au contacts were evaporated and alloyed. The volume resistivity after these treatments was found by potential probing (in region "*lf*" *of FIG. 1) to be* $\rho = 1.5\times10^8$ ohm-cm at 22° C. With $\epsilon$(GaAs) $\approx 10^{-12}$ Farad/cm, the resulting $\tau^D = \rho\epsilon \approx {}^{10-4}$ sec $>> \tau_o \gtrsim 10^{-8}$ sec. Result for a particular diode (area $A = 4\times10^{-3}$ cm$^2$, length $L = 4.5\times10^{-2}$ cm) are shown in FIG. 1. The distinct regions of the I(V) curves are discussed individually using simplified concepts here rather than large-signal nonlinear theory. (see Proceedings of Tenth International Conference on the Physics of Semiconductors, (U.S. Atomic Energy Commission 1970)p.832).

Reverse-bias region "1*r*," $|V| < 0.2$, is linear ($S = d(\ln I)/d(\ln V) = 1$) corresponding to $R_1 = 5\times10^9$ ohms. The resistance $R_1$ is about three times greater than expected from the n-region alone. The largest contribution to $R_1$ is by the space-charge region (SCR) adjacent to the junction. The positive charge is fixed at donors and traps. The SCR width $w = 7\times10^{-3}$ cm was obtained by capacitance measurements and by potential probing. Average resistivity in the SCR is thus $\rho = 2\times10^9$ ohm-cm, close to the "maximum resistivity,"

$$\rho_{max} = b^{1/2}/2qn_i\mu_n, \qquad (1)$$

where $b$ is the mobility ratio $\mu_n/\mu_p$, $q$ the electron charge $n_i$ the intrinsic carrier concentration. The maximum resistivity is a significant quantity in relaxation-case material. The condition $\tau_D > \tau_o$ implies a region of steady-state zero local recombination, which in turn requires, for the steady-state concentrations $n$ and $p$ of mobile electrons and holes, $$np = n_i^2 \neq n_i^2 \exp(qV/kT). \qquad (2)$$

Here the last expression is essential in the conventional lifetime regime. (See Electrons and Holes in Semiconductors, D. van Nostrand Co., Inc., Princeton, New Jersey, 1950, pp. 58 and 59, and Vol. 28, Bell System Technical Journal p. 435 (1949).) Equation (1) implies $n(\rho_{max}) = n_m = n_i b^{-1/2}$, $p_m = n_i b^{1/2}$, and $\mu_n n_m = \mu_p p_m$. Resistivity in an SCR can be shown to approach $\rho_{max}$ in the relaxation case. At 22°C, $n_i = 9\times10^5$ carriers/cm$^3$,[9] $b \approx 20$,[10] thus $\rho_{max} \approx 3\times10^9$ ohm-cm.

Reverse currents are sustained by carriers thermally generated in the SCR. Sufficiently low reverse voltages do not deplete electrons near the interface of the SCR and ntregion, because electrons can diffuse back. A measure for this diffusion tendency is the equilibrium contact potential between the SCR and n-region $$V_c = (kT/q)[1n(n_o/n_m)] \approx 0.1\ V. \quad (3)$$

When reverse bias ($V'_c$ of FIG. 1) becomes comparable to $V_c$ plus the IR-drop in the n-region, the SCR widens by $\Delta w$ through removal of mobile electrons. Incremental resistance ΔR and current ΔI are both proportional to $\Delta w$, thus $$\Delta I \propto \Delta R = \Delta V/\Delta I, \Delta I \propto (\Delta V)^{1/2}. \quad (4)$$

The sublinear region "2r" obeys the predicted onset involving the estimate of Eq. (3) and the square-root dependence $S = 1/2$ of Eq (4). Region "2r" should end when the entire sample is an SCR, which implies $R_3 = \rho_{max}L/A \approx 3\times10^{10}$ ohms. This prediction that the linear region "3r" has resistance $R_3$ is verified.

Space-charge-limited currents constitute region "4r.' ' This mechanism is well understood from the work of Rose and Lampert (see Vol. 97, Physical Review, p.1538 (1956) and Vol. 103, Physical Review, p1,648 (1956); a review in Vol. 27, Reports on Progress in Physics, p. 329 (1964)). Onset occurs at $$V_{tr} = (8/9)qpN_t^pL^2/\epsilon, \quad (5)$$

where $N_t^p$ is the ratio of trapped to free holes. From the experimental $V_{tr} \approx 120$ V for hole injection from the n-side contact, we deduce $pN_t^p \approx 4\times10^{11}$ holes/cm³ and estimate $N_t^p \approx 10^5$, using $p = p_m$. The well known square law, $$I = [(9/8)A\epsilon\mu_p/L^3N_t^p]V^2, \quad (6)$$

is usually observed throughout "4r." Often, as in FIG. 1, the square law is followed by a steeper increase ($S \approx 3$) which might be the $I \propto V^3$ law of Lampert and Rose in their "low-field approximation" of double injection.

Forward branch "1f" extends linearly to about 10 $V$, while linearity in the lifetime-case ends at $V = kT/q\ q \approx 2.5\times10^2$ V at 300°K. The SCR resistance $R_1$ dominates as in "1r." Holes and electrons are swept into the SCR where rapid recombination insures Eq. (2). The sublinear region "2f" with $S \approx 0.4$ begins when injected holes traverse the entire SCR width $w$. These holes deplete majority electrons and widen the SCR, increasing resistance. Space-charge is built up through hole capture by coulomb-attractive centers which become neutral and no longer compensate the positive donors. Detailed theory is complicated but a simple estimate for the kink voltage $V_k$ can be made by neglecting diffusion. The average field $V_k/w$ must suffice for traversal of $w$ within a lifetime $\tau_p$, yielding see Vol. 103, Physical Review, p. 1648 (1956), Vol. 20, RCA Review, p. 682 (1959), and Vol. 121, Physical Review, p. 26 (1961) for a similar argument in a different regime. The experimental $V_k \approx 10\ V$ implies $\tau_p \approx 2\times10^{-8}$ sec (with $\mu_p = 2\times10^2$ cm²/$V$-sec), which seems not too long a lifetime since most hole traps are now filled. Region "3f" is not pronounced and believed to be space-charge-limited. Region "4f," shown schematically by the dash-dotted curve, illustrates the negative resistance of "double injection."

The potential plots of FIG. 2 verify the above interpretations. Curve A is typical for region "1f" with its SCR and ohmic n-type material. From curves B to F (region "2f," FIG. 1), SCR widening with increasing bias is evident. The distinct ranges of electric field are exemplified in curve C. The region $\alpha$ is the high-field SCR, while $\beta$ is a narrow layer of very low field, the predicted "branch point," where the current is by hole diffusion. The adjacent high field of range $\gamma$ produces drift of holes and electrons in a depleted layer. The "recombination front" is at the end of this depleted layer and adjacent to range $\delta$, which has low field and mainly electron diffusion, and range $\zeta$ shows the unmodulated material. The potential profiles under reverse bias also agree with the interpretations. In region "2r" a "generation front" moves toward the cathode, while region "3r" has uniform high field and $\rho \approx \rho_{max}$.

Temperature $T$ affects the currents because of the temperature dependent exponential $n_i(T)$. I(V) was, therefore, measured above room temperature. As expected, all linear and sublinear relaxation-case currents scale with the ratio $N = n_i(T_1)/n_i(T_2)$. For example, at 54°C, $n_i$ is $2.3\times10^7$ cm$^{-3}$. The transition voltages are merely reduced by 10 percent. The space-charge-limited currents in ranges ("4r" and "3f"), however, increase by only about 0.6$N$, which distinguishes them from the relaxation-case currents.

In conclusion, a p–n junction in a semiconductor with $\tau_D >> \tau_o$ is completely different from the conventional lifetime-case ideal rectifier. The distinct regions of linear and sublinear I(V) relations can be explained by the basic ideas of the theory of the relaxation regime. Large classes of materials obey the relaxation-case condition. Variations in I(V) relations may be obtained through variation of relevant parameters, such as geometry, mobilities, trap densities, and lifetimes.

Figure 3:
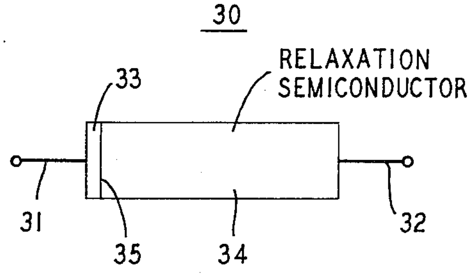
FIG. 3 is a plan view of an injector diode in accordance with the invention.

The device of FIG. 3 is an exemplary injection diode 30 provided with electrodes 31 and 32, respectively, contacting regions 33 and 34 which, in turn, define junction 35. Region 34 is a relaxation semiconductor of a given conductivity type (p or n), while region 33 may be composed of a lifetime or relaxation semiconductor of conductivity type opposite to that of region 34. Junction 35 is ordinarily, although not necessarily, a homojunction. Electrode contact accomplished by means of electrode 32 may or may not be capable of majority carrier injection. Such capability is necessary at a potential in the vicinity of or above that corresponding with expansion of the space-charge region to fill the entirety of region 34 where a forward biased negative-resistance region is desired. As in usual semiconductor devices, the function of electrode 32 may be accomplished or supplemented by an additional junction not shown. Additional electrodes and/or junctions may be utilized to further modify the I(V) characteristics shown in FIG. 1 in manner analogous to that of usual device design.

3. Design Considerations

The general design requirements have been set forth. Semiconductor material at least on one side of a junction must be of the relaxation regime, and the length of that region in the bias direction must be sufficient to contain a complete zero-biased space-charge region and also at least a thin layer of "normal" material.

For the inventive purposes, a relaxation material is defined as one in which dielectric relaxation time exceeds carrier diffusion length lifetime by a factor of at least two and preferably five. While similar factors yield device characteristics which differ from those of typical devices, the minimum factor described assures sufficiently well-defined I(V) characteristics to be of device significance.

The device length must be at least 1.1 times greater than the zero bias depletion width $w$. The zero bias depletion width is determined by the concentration of the traps that become filled by the minority carriers. This trap concentration also determines the forward-bias voltage at which sublinear dependence begins. The zero bias depletion is given by the familiar expression $w = \sqrt{2\epsilon V_B/qn_t}$, where $V_B$ is the build-in voltage and $n_t$ the trap concentration.

Mechanical requirements in connection with FIGS. 1 and 2 utilized gallium arsenide of the characteristics noted. Any material meeting the general requirement is appropriate. In general, a fundamental requirement for the relaxation regime is a resistivity of the order of $10^4$ ohm-cm or higher, so that $\rho$ greater than $2\tau_{68}/\epsilon$ may be achieved. At room temperature this gives rise to the requirement of a bandgap of at least about 1 ev. Exemplary materials are silicon, gallium arsenide, gallium phosphide, gallium nitride, indium phosphide, aluminum arsenide, aluminum phosphide and solid solutions of the foregoing.

The essential p–n junction, i.e., that shown in FIG. 3, must be capable of minority carrier injection in the forward biased condition. This requirement is met for most p–n junctions, and the general parameter requirements now so well established are well understood by those skilled in the art.

Where the electrode at the end of the relaxation semiconductor region removed from the junction is to operate as a majority carrier injector, further requirements are imposed. Use may be made of electrodes or semiconductor regions doped with such conductivity-determining impurities as to yield a higher net density of carriers of the same type as those predominating in the region to which contact is made. An "ohmic" contact, which can inject either majority or minority carriers depending on its polarity and on the magnitude of the field near it, can also be employed.

What is claimed is:

1. Semiconductor device comprising first and second semiconductor regions of different conductivity type so defining a junction at their interface together with first and second means for electrically contacting said first and second regions, respectively, said first and second means contacting the regions at positions remote from said junction, said first region being of sufficient length between said junction and said first means to contain the entirety of a zero-bias space-charge region lying on that side of said junction within said first region together with additional material lying outside said space-charge region, said additional material being contacted by said first means characterized in that said first region consists essentially of crystalline semiconductor material in which the dielectric relaxation time, defined as the product of resistivity and the real component of the dielectric constant, exceeds carrier diffusion length lifetime by a factor of at least two.

2. Device of claim 1 in which said junction is a p-n junction and in which said first region is at least 1.1 times the zero-bias space-charge region in length.

3. Device of claim 1 in which said first and second means provide for forward bias.

4. Device of claim 1 in which said first and second means provide for reverse bias.

5. Device of claim 1 in which the semiconductor material of said first region is n-type gallium arsenide.

6. Device of claim 5 in which the said second region is p-type gallium arsenide.

7. Device of claim 6 in which diffused zinc provides said p-type gallium arsenide.

8. Device of claim 1 in which said second means provides for majority carrier injection.

* * * * *

UNITED STATES PATENT OFFICE
CERTIFICATE OF CORRECTION

Patent No. 3,697,834 Dated October 10, 1972

Inventor(s) H.C.Casey, Jr-W.W.van Roosbroeck

It is certified that error appears in the above-identified patent and that said Letters Patent are hereby corrected as shown below:

Column 2, line 54, change "is" to --to--.

Column 3, line 14, change "$10_4$ ohm-cm" to --$10^4$ ohm-cm--.

Column 4, line 16, after "reverse" delete "(See" and insert --current--;

line 19, change "$n_o$=3X$10_7$" to read --$n_o$=3 X $10^7$--.

Column 5, line 2, change "ntregion" to read --n-region--;

line 40, change "V = kT/qq" to read --V = kT/q--;

line 54, after "yielding" insert --$V_k = w^2/\mu_p\tau_p$--.

Column 7, line 13, after "depletion" insert --width--;

line 21, change "$2\tau_{68}/\varepsilon$" to --$2\tau_o/\varepsilon$--.

Signed and sealed this 13th day of March 1973.

(SEAL)
Attest:

EDWARD M.FLETCHER,JR.
Attesting Officer

ROBERT GOTTSCHALK
Commissioner of Patents